Patented Nov. 18, 1952

2,618,616

UNITED STATES PATENT OFFICE 2,618,616

MODIFIED ALKYD RESINS AND COMPOSITIONS CONTAINING THE SAME

Roy W. H. Tess and Thomas F. Mika, Orinda, Calif., assignors to Shell Development Company, San Francisco, Calif., a corporation of Delaware No Drawing. Application July 27, 1950,
Serial No. 176,248

13 Claims. (Cl. 260—22)

This invention relates to synthetic resins of the alkyd type and to compositions containing the same. More particularly, the invention relates to a new class of oil modified alkyd resins and to their utilization, particularly in the preparation of coating compositions.

Specifically, the invention provides new and particularly useful oil modified alkyds consisting of the resinous reaction product of a mixture comprising a polybasic acid or derivative thereof, a polyhydric alcohol containing at least three esterifiable hydroxyl groups and 25% to 50% by weight of the said alkyd of a modifying agent comprising a mixture of a drying oil acid or derivative thereof and an aromatic monocarboxylic acid having one of its ring carbon atoms joined to an open chain aliphatic radical which radical when attached to the ring contains a quaternary carbon atom, the aromatic monocarboxylic acid making up only from 21% to 38% by weight of the said modifying agent. The invention further provides surface coating compositions, particularly baking enamels, containing these modified alkyds.

Oil modified alkyd resins have been found to be valuable additives for coating compositions, such as baking enamels, as they impart adhesion and depth of finish to the resulting films. Enamels containing these alkyds are inapplicable for many applications, however, as their baked films are relatively soft and have poor color and gloss retention. The hardness may in some cases be improved by the addition of urea-formaldehyde and melamine-formaldehyde resins but this addition causes the films to lose part of their flexibility and the films still possess poor color and gloss retention.

It is an object of the invention, therefore, to provide a new class of oil modified alkyd resins. It is a further object to provide short oil modified alkyd resins having improved properties as additives for coating compositions. It is a further object to provide oil modified alkyds which impart outstanding resistance to loss of color and gloss to coating compositions, such as the baking enamels. It is a further object to provide oil modified alkyds which impart hardness to the coating films. It is a further object to provide oil modified alkyds which possess improved compatibility with the organic materials generally employed in the preparation of coating compositions. It is a further object to provide modified alkyd resins having low viscosities and improved solvent tolerance. It is still a further object to provide surface coating compositions having many improved properties. Other objects and advantages of the invention will be apparent from the following detailed description thereof.

It has now been discovered that these and other objects may be accomplished by oil modified alkyd resins consisting of the resinous reaction product of a mixture comprising a polybasic acid or derivative thereof, a polyhydric alcohol containing at least three esterifiable hydroxyl groups, and 25% to 50% by weight of said alkyd of a modifying agent comprising a mixture of a drying oil acid or derivative thereof and an aromatic monocarboxylic acid having one of its ring carbon atoms joined to an open chain aliphatic radical which radical when attached to the ring contains a quaternary carbon atom, the aromatic monocarboxylic acid making up only from 21% to 38% by weight of the said modifying agent. The alkyds modified with this unique combination of agents have been found to possess outstanding beneficial properties as additives for surface coating compositions. Baking enamels containing these alkyds have, for example, been found to possess excellent color and gloss retention. Films containing the novel alkyds of the invention may be exposed to ultraviolet radiations or relatively high temperatures for extended periods without undergoing any substantial change in color or suffering any loss of gloss. These alkyds have also been found to improve the hardness of the films so that satisfactory enamels can be obtained without the addition of the usual hardening agents such as the melamine-formaldehyde resins. Considerable advantage is also found in the fact that the novel alkyds of the invention have unusually high compatibility with other film-forming materials and with the plasticizers and solvents usually employed in surface coating compositions and the most effective amounts of these components may be employed without materially affecting the clearness and homogeneity of the resulting films.

The acids to be used as modifiers for the novel alkyds of the invention comprise the aromatic monocarboxylic acids having an aromatic nucleus wherein one of the ring carbon atoms of that nucleus is joined to a carboxyl group and another ring carbon atom is joined to an aliphatic open chain radical which radical when attached to the ring contains a quaternary carbon atom, said quaternary carbon atom preferably being not more than three carbon atoms removed from said nucleus. The aromatic nucleus may if desired be substituted with other substituents such as halogen atoms, short chain alkyl radicals, alkoxy radicals, and the like. The aliphatic open chain radical attached to the aromatic nucleus may be saturated or unsaturated and may be further substituted as desired. Examples of these radicals are tert-butyl, tert-octyl, tert-amyl, tert-hexyl, 2,2-diethylbutyl, 1,1-dimethylpropen-2-yl, 1-methyl-1-ethylhexyl, 3,3-ditertbutylamyl, 1,1-diethyl-3-nitrohexyl, and the like.

Illustrative examples of the above-described substituted aromatic acids are p-tert-butylbenzoic acid, p-tert-decylbenzoic acid, m-tert-amylbenzoic acid, m-tert-octylbenzoic acid, m-tert-hexyl-p-chlorobenzoic acid, m-tert-butyl-p-tert-amylbenzoic acid, m-chloro-p-tert-hexylbenzoic acid, m-ethyl-p-tert-nonylbenzoic acid, p-(3,3-dipropylbutyl)benzoic acid, 2,5-dichloro-4-tert-octylbenzoic acid, 4-tert-butyl-1-naphthoic acid, and m-(2,2-diisobutylhexyl)benzoic acid.

Preferred acids are those wherein the open chain aliphatic radical joined to the aromatic ring is a tertiary alkyl radical containing from 4 to 16 carbon atoms, such as p-tert-butylbenzoic acid, m-tert-hexylbenzoic acid, p-tert-dodecylbenzoic acid, m-propyl-p-tert-heptylbenzoic acid, and the like.

Coming under special consideration, particularly because of the fine quality of alkyds that may be produced therefrom, are the aromatic monocarboxylic acids possessing a single aromatic ring wherein one of the ring carbon atoms is joined to a carboxyl group and another ring carbon atom, preferably in the para position thereto, joined to a tertiary alkyl radical containing from 4 to 10 carbon atoms, and the remaining ring carbon atoms are joined to a member of the group consisting of hydrogen, halogen and lower alkyl radicals, preferably the straight chain alkyl radicals containing from 1 to 4 carbon atoms.

The drying component to be added as a modifier in combination with the above-described substituted aromatic acids comprise the drying oil acids, i. e., the polyethylenic acids derived from the drying oils, and their derivatives, such as their esters, amides, and the like. Examples of these acids and derivatives include the acids derived from oils such as linseed, soyabean, perilla, oiticia, tung, walnut, and dehydrated castor oil, as linoleic, linolenic, 9,12-octadecadienoic, 9,12,15-octadecatrienoic, and elaeostearic acid; the monohydric alcohol esters of the drying oil acids, such as methyl elaeostearate, butyl elaeostearate, ethyl, 9,12-octadecadienoate, butyl 9, 12, 15-octadecatrienoate, and octyl 9,12-octadecadienoate; the glycerides of the fatty acids of the drying oils, such as the monoglyceride of the linseed oil acids, the diglyceride of the soyabean acids, the monoglyceride of the tung oil acids, and the drying oils themselves, such as tung oil, soyabean oil, sunflower, rapeseed, hempseed, sardine, cottonseed oil, and the like.

The preferred modifiers comprise the drying oil fatty acids and their mono- and diglycerides. Particularly preferred modifiers are the drying oil fatty acids containing at least 12 carbon atoms.

The polycarboxylic acids used in the preparation of the novel alkyds may be any of those generally employed in the preparation of this type of resin. These acids may possess two, three, four, or more carboxyl groups and may be aliphatic, alicyclic, heterocyclic, or aromatic and may be saturated or unsaturated. Examples of such acids are malonic, glutaric, succinic, suberic, citric, tricarballylic, cyclohexanedicarboxylic, maleic, fumaric, itaconic, citraconic, mesaconic, phthalic, isophthalic, terephthalic 1,8-naphthalenic, adipic, sebacic, azelaic, pimelic, chlorosuccinic, bromomaleic, dichlorophthalic, dihydroacrylic, and benzophenon-2,4'-dicarboxylic acid.

The preferred polycarboxylic acids to be used in producing the novel alkyds are the dicarboxylic acids containing from 2 to 10 carbon atoms, such as succinic, glutaric, adipic, suberic, maleic, phthalic, diethylphthalic, and the like. Particularly preferred polycarboxylic acids are the aromatic dicarboxylic acids, containing from 6 to 10 carbon atoms wherein the two carboxyl groups are attached directly to the aromatic nucleus.

In some cases it may be desirable to utilize other forms of the acids, such as the acid anhydrides or acid chlorides, as phthalic anhydride, maleic anhydride, succinic chloride, and the like.

The esters of the polybasic acids may be utilized in case the alkyds are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, and amyl alcohol.

The polyhydric alcohols used in the preparation of the alkyds of the invention are those containing at least three esterifiable hydroxyl groups. Illustrative examples of such alcohols are glycerol, polyglycerol, pentaerythritol, mannitol, trimethylolpropane 1,2,6-hexanetriol, polypentaerythritol, polyallyl alcohol, polymethallyl alcohol, polyols formed by the condensation of bis-phenols with epichlorohydrin, and the like.

Preferred polyhydric alcohols to be used in the preparation of the alkyds are the aliphatic alcohols possessing from 3 to 6 hydroxyl groups and containing from 3 to 14 carbon atoms, such as glycerol pentaerythritol, manitol, 1,4,6 octanetriol, 1,3,5-hexanetriol and 1,5,10-dodecanetriol.

If desired other modifiers in addition to those described above may be utilized in the preparation of the novel alkyds. Such modifiers include the protein plastics, natural resins as rosin, synthetic resins as the phenol-aldehyde, urea-aldehyde and melamine-aldehyde type resins, synthetic resins obtained by the addition polymerization of unsaturated compounds, such as styrene, alpha-methylstyrene, vinyl chloride, vinylidene chloride, vinyl acetate, methyl acrylate, methyl methacrylate, and the like, as well as mixtures thereof.

A single polybasic acid or derivative, polyhydric alcohol, substituted aromatic acid and drying oil acid or derivative may be used in the preparation of the novel alkyds or a mixture of one or more of these components may be utilized. Thus, for example, the polybasic acid and polyhydric alcohol may be reacted with a single substituted aromatic acid and a single drying oil acid, or they may be reacted with a mixture of substituted aromatic acids and/or a mixture of drying oil acids or their derivatives.

The production of the alkyds of the invention may be accomplished by any suitable method. They may be prepared, for example, by mixing the polyhydric alcohol, polybasic acid or derivative thereof and the mixture of modifiers in any order and then heating the resulting mixture, or alternatively, by first heating and reacting the polyhydric alcohol with the polybasic acid or derivative and subsequently adding the modifying agents, or by first heating the alcohol with the modifying agents and then adding the polybasic acid or derivative.

The resins are preferably prepared, however, by mixing the polyhydric alcohol with the polybasic acid or derivative and the mixture of modifying agents and subjecting the resulting mixture to heat. Ordinarily no catalyst need be employed to effect this reaction, but if desired, substances such as p-toluene sulfonic acid, zinc chloride, stannic chloride, calcium acetate, barium acetate, zinc acetate, hydrochloric acid, litharge, etc., in amounts preferably varying from 0.1% to 5% by weight of reactants may be employed.

The proportions in which the polyhydric alcohol and polybasic acid or derivative are combined may vary over a considerable range. Satisfactory results are generally obtained when there is up to 30 mol percent excess of either reactant. Ordinarily, however, the polybasic acid will be reacted with an excess up to 30 mol percent of the polyhydric alcohol.

The total amount of the modifying agents which include the substituted aromatic acids and the drying oil acids or derivatives should vary between 25% and 50% by weight of the alkyd resin being formed. Preferably, the amount of the modifying agents will vary from 30% to 40% by weight of the alkyd. The ratio in which the substituted aromatic acid and the drying oil acids or derivatives are combined may vary only with certain restricted limits. Alkyds having the desired properties, such as improved color and gloss retention, hardness and flexibility, are obtained only when the substituted aromatic acid makes up from 21% to 38% by weight of the modifying mixture, and more preferably between 21% and 30% by weight of the mixture of modifiers.

The temperature employed during the resin-forming reaction may vary over a considerable range depending upon the type of reactants, catalysts, etc. In most cases the temperature will range between about 100° C. and about 300° C., with a preferred range varying between 200° C. and 250° C.

The resin-forming reaction may be accomplished in the presence or absence of solvents or diluents. If solvents or diluents are employed it is desirable to utilize inert organic compounds, such as benzene, toluene, xylene, cyclohexane, chloroform, carbon tetrachloride, and the like.

It is preferred in most cases to accomplish the resin-forming reaction under a blanket of an inert gas, at least during the initial stages of the reaction. By an inert gas is meant one substantially devoid of oxygen, such as nitrogen, carbon dioxide, and the like. Atmospheric, superatmospheric, or subatmospheric pressures may be used.

The water formed during the reaction may be removed during the said reaction or its completion. It is preferably removed substantially as fast as it is formed therein. The removal of the water may be accomplished by any suitable means, such as distillation and the like.

As the alkyds are heat-convertible, care should be taken during the reaction to avoid converting the resin to a step beyond that of being fusible. This will occur if the reaction mixture is overheated or heated too long. To avoid this difficulty the course of the reaction is conveniently followed by making determinations of the viscosity and acid number upon samples withdrawn from the reaction mass or by other well known methods. Ordinarily the heating is continued until the viscosity has reached the desired value and the acid number has been reduced to a value between about 5 and 20.

When the reaction is substantially complete as shown by the above-described methods the inert solvents or diluents, remaining water, uncombined reactants and by-products are preferably removed from the reaction mixture. Removal is conveniently accomplished by vaccum distillation, however, other means well known to the art may also be utilized.

If alkyd resins having extremely low acid numbers are desired they may be conveniently prepared by the ester-exchange method mentioned above. According to this process the esters of the polyhydric alcohol and/or esters of the polycarboxylic acids in the proportions described hereinabove for the alcohols and acids, are heated together in the presence of the desired modifying agents and the ester-exchange catalyst, and the alcohol, acid or ester formed in the reaction is removed, preferably by distillation.

As indicated, the novel alkyds of the invention are particularly valuable as film-forming components for surface coating compositions, such as baking enamels. These compositions are usually prepared by adding the novel alkyds with the desired pigments to a solvent usually employed in the preparation of such coatings. Solvents employed in the preparation of baking enamels include benzene, toluene, xylene, higher boiling aliphatic, aromatic or naphthenic hydrocarbons, and the like and mixtures thereof. The amount of the solvent employed will vary over a considerable range depending chiefly upon the viscosity desired in the finished solution. In general, amounts of solvent varying from 20% to 70% by weight of the total composition are usually satisfactory.

Driers, such as cobalt, manganese, and lead naphthenates and linoleates, while not an essential constituent of the coating compositions of the invention, may be added in many cases to hasten the drying of the films. The amount of the drier employed will generally be quite small, such as, for example, from 0.1% to .001% by weight of the alkyd resin.

Other film-forming materials may also be added in combination with the novel alkyds of the invention. Such materials include the drying oils, drying oil varnishes, natural resins, cellulose derivatives, such as cellulose nitrate, ethyl cellulose and butyl cellulose, soluble amide-aldehyde-type resins, such as urea-formaldehyde resins, thiourea-aldehyde resins, guanidine-formaldehyde resins, and melamine-formaldehyde resins, and soluble phenol-formaldehyde-type resins.

Additives, such as, plasticizers, stabilizers, lubricants and fillers may also be added to the coating compositions of the invention as desired or necessary.

The coating compositions of the present invention are superior to many of the coatings now available in industry. The compositions form clear finishes having excellent hardness and good gloss and color retention. Coating compositions may be applied to substantially any surface, such as, steel or metal, either primed or unprimed, or to wood directly or over a suitable base coat. They may also be applied over glass, leather, stone, cloth, paper, rubber, or films of other film-forming organic materials. The solvents may be evaporated at room temperature but in most cases it is preferred to bake the coating by the application of infra-red rays or in a suitable oven. In the latter case, very high temperatures may be employed without causing discoloration or causing decomposition of the coating.

To illustrate the manner in which the invention may be carried out, the following examples are given. It is to be understood, however, that the examples are for the purpose of illustration and the invention is not to be regarded as limited to any of the specific conditions or reactants cited therein. Unless otherwise specified, parts described in the examples are parts by weight.

EXAMPLE I

A series of short oil alkyd resins were prepared in the following manner. A mixture comprising phthalic anhydride, glycerol, fumaric acid and the desired modifying agent or agents was placed in a flask equipped with a phase separation head, thermometer well, stainless steel stirrer and carbon dioxide bubbler. The contents of the flask were then heated upwards from 20° C. to 250° C. over a period of about four hours and then held at that temperature for about 45 minutes. At the conclusion of the reaction, the resulting alkyd was blown for about 20 minutes with carbon dioxide. The specific ingredients and proportions used in the preparation of each of the alkyds as well as some of the properties of said alkyds are shown in the following table:

Table I

| Alkyd No. | Glycerol | Ingredients, percent by weight | | | | Acid No. |
| --- | --- | --- | --- | --- | --- | --- |
| | | Phthalic Acid | Fumaric Acid | Soya Acid | p-Tert-Butyl Benzoic Acid | |
| 1 | 24.1 | 39.6 | .75 | 39.2 | 0 | 13 |
| 2 | 24.5 | 36.6 | .76 | 35.9 | 2.27 | 15 |
| 3 | 28.2 | 37.6 | .78 | 28.7 | 7.6 | 9 |
| 4 | 26 | 38.8 | .8 | 21.2 | 13.2 | 11 |

White baking enamels were prepared from each of the short oil alkyds shown above by mixing the said alkyds with titanium dioxide, xylene, and a drier according to the following formula:

31.8% titanium dioxide
34.1% alkyd resin solids
34.1% xylene
0.05% cobalt based on resin solids Each of the coatings was then sprayed on steel panels and the films cured for 20 to 30 minutes at 150° C. A portion of each coated panel was covered with aluminum foil and all of the panels were exposed to ultraviolet light for about 200 hours. At the end of this period the foils were removed and both portions of the panel examined to determine any loss of color and gloss due to the exposure. The results are indicated in the following table:

Table II

| Alkyd No. | Percent p-Tert-Butyl-benzoic Acid of Total Modifying Agent | Results of Examination | |
| --- | --- | --- | --- |
| | | Gloss | Color |
| 1 | 0 | loss of gloss | discoloration. |
| 2 | 6 | do | Do. |
| 3 | 21 | no loss | no substantial discoloration. |
| 4 | 38 | do | no discoloration. |

The above results clearly demonstrate the outstanding improvement in gloss and color retention that is obtained by replacing the drying oil component with specific proportions of the p-tert-butylbenzoic acid.

These results were quite unexpected for it had been previously found that replacement of the drying oil component of these alkyds with agents, such as the melamine-formaldehyde resin, had no effects on improving the color and gloss retention of the enamel films. An enamel prepared, for example, by replacing about 5% of the No. 1 alkyd resin in the above-described formula with melamine-formaldehyde resin gave baked films which still showed considerable discoloration and loss of gloss after 200 hours exposure to ultraviolet light.

EXAMPLE II

About 290 parts of glycerol, 370 parts of linseed oil fatty acids, 435 parts of phthalic anhydride, 9 parts of fumaric acid and 100 parts of p-tert-butylbenzoic acid are placed in the flask shown in Example I and heated upwards from 20° C. to 275° C. over a period of about four hours and then held at that temperature for about 30 minutes.

Other alkyds are obtained by replacing the linseed oil fatty acids in the above-described process with equivalent weights of each of the following agents: monoglyceride of dehydrated castor oil, tung oil fatty acids, monoglyceride of linseed oil fatty acids and methyl elaeostearate.

White baking enamels are prepared by mixing 34.1% by weight of each of the alkyds prepared above with 31.8% titanium dioxide and 34.1% solvent. Steel panels are coated with each of the resulting enamels and then cured for 20 to 30 minutes at 150° C. These cured films are very hard and show excellent color and gloss retention.

EXAMPLE III

About 350 parts of pentaerythritol, 470 parts of soyabean acids, 435 parts of phthalic anhydride, 9 parts of fumaric acid and 150 parts of p-tert-butylbenzoic acid are mixed together and heated upwards from 20° C. to 230–250° C. over a period of about 4 hours and then held at that temperature for about an hour.

Other alkyds are obtained by replacing the pentaerythritol in the above process with equivalent amounts of each of the following polyhydric alcohols: 1,2,6-hexanetriol, trimethylolpropane and mannitol.

White baking enamels are prepared by mixing 34.1% by weight of the alkyds prepared by the above-described process with 31.8% titanium dioxide and 34.1 solvent. Steel panels are coated with the resulting enamels and then cured for 20 to 30 minutes at 150° C. These cured films are very hard and flexible and show improved resistance to loss of color and gloss.

EXAMPLE IV

About 250 parts of glycerol, 370 parts of linseed oil fatty acids, 435 parts of phthalic anhydride and 100 parts of p-tert-hexylbenzoic acid are heated upwards from 20° C. to 230–250° C. for a period of about four hours and then held at that temperature for about an hour. The resulting product is utilized in the preparation of enamels as shown in the preceding example. Baked films from the resulting enamel are hard and flexible and show good color retention.

We claim as our invention:

1. A short oil modified alkyd comprising the resinous reaction product of a mixture of phthalic acid anhydride, an excess to 30 mol percent excess of glycerol, 28% by weight of the alkyd of soya bean acid and 7% by weight of the alkyd of p-tert-butylbenzoic acid.

2. A short oil modified alkyd comprising the resinous reaction product of a mixture of phthalic acid anhydride, an excess to 30 mol percent excess of glycerol, and 25% to 50% by weight of the said alkyd of a modifying agent consisting of a mixture of soya bean acid and p-tert-butylbenzoic acid wherein the said p-tert-butylbenzoic acid makes up 21% to 38% by weight of the modifying agent.

3. A short oil modified alkyd comprising the resinous reaction product of a mixture of phthalic acid anhydride, an excess to 30 mol percent excess of pentaerythritol, and 25% to 50% by weight of the said alkd of a modifying agent consisting of a mixture of soya bean acid and p-tert-butylbenzoic acid wherein the said p-tert-butylbenzoic acid makes up 21% to 38% by weight of the modifying agent.

4. A short oil modified alkyd comprising the resinous reaction product of a mixture of phthalic acid anhydride, an equimolecular to 30 mol percent excess of glycerol, and 25% to 50% by weight of the said alkyd of a modifying agent consisting of a mixture of a monoglyceride of dehydrated castor oil and a mono-tertiary alkyl substituted benzoic acid wherein the said substituted benzoic acid makes up from 21% to 38% by weight of the modifying agent.

5. A short oil modified alkyd comprising the resinous reaction product of a mixture of phthalic acid anhydride, an equimolecular to 30 mol percent excess of glycerol, and 25% to 50% by weight of the said alkyd of a modifying agent consisting of a mixture of linseed oil fatty acids and a mono-tertiary alkyl substituted benzoic acid, wherein the said substituted benzoic acid makes up from 21% to 38% by weight of the modifying agent.

6. A short oil modified alkyd comprising the reaction product of a mixture of an aromatic dicarboxylic acid, an excess to 30 mol per cent excess of an aliphatic polyhydric alcohol containing at least three esterifiable hydroxyl groups, and 25% to 50% by weight of the said alkyd of a modifying agent consisting of a drying oil fatty acid and a mono-tertiary alkyl substituted benzoic acid containing from 4 to 10 carbon atoms in the tert-alkyl side chain, the said substituted benzoic acid making up from 21% to 38% by weight of the modifying agent.

7. A modified alkyd consisting of the resinous reaction product of a mixture comprising a dicarboxylic acid containing from 2 to 10 carbon atoms, an equimolecular to 30 mol per cent excess of an aliphatic polyhydric alcohol containing at least three esterifiable hydroxyl groups, and 25% to 50% by weight of the said alkyd of a modifying agent consisting of a drying oil fatty acid and a mono-tertiary alkyl substituted aromatic monocarboxylic acid wherein the carboxyl group is attached directly to the aromatic nucleus and the tert-alkyl side chain contains from 4 to 16 carbon atoms, the said aromatic monocarboxylic acid making up from 21% to 38% by weight of the modifying agent.

8. A resinous reaction product of a mixture comprising an acid component of the group consisting of polycarboxylic acids, polycarboxylic acid anhydrides, and polycarboxylic acid halides, an alcohol containing at least three esterifiable hydroxyl groups, and 25% to 50% by weight of the said alkyd of a modifying agent consisting of at least one drying component of the group consisting of drying oils, drying oil fatty acids, mono- and diglycerides of the drying oil fatty acids and monohydric alcohol esters of the drying oil fatty acids, and at least one aromatic monocarboxylic acid wherein one of the ring carbon atoms is joined to a carboxyl group and a single other ring carbon atom is joined to a tertiary alkyl radical wherein the said tertiary alkyl radicals contain from 4 to 16 carbon atoms, the said aromatic acid making up from 21% to 38% by weight of the modifying agent.

9. An enamel coating composition comprising an aromatic hydrocarbon solvent for oil-modified alkyds, pigments, driers, and a short oil-modified alkyd resin comprising the resinous reaction product of a mixture of phthalic acid anhydride, an excess to 30 mol per cent of glycerol, 28% by weight of the alkyd of soya bean acid and 7% by weight of the alkyd p-tert-butylbenzoic acid.

10. An enamel coating composition comprising an aromatic hydrocarbon solvent for oil-modified alkyds, pigments, driers, and a short oil-modified alkyd resin comprising the resinous reaction product of a mixture of phthalic acid anhydride, an excess to 30 mol per cent of pentaerythritol, and 25% to 50% by weight of the said alkyd of a modifying agent consisting of a mixture of soya bean acid and p-tert-butylbenzoic acid wherein the said p-tert-butylbenzoic acid makes up from 21% to 38% by weight of the said modifying agent.

11. An enamel coating composition comprising an aromatic hydrocarbon solvent for oil-modified alkyds, pigments, and a short oil-modified alkyd resin comprising the resinous reaction product of a mixture of phthalic acid anhydride, an excess to 30 mol per cent excess of an aliphatic trihydric alcohol, and 25% to 50% by weight of the said alkyd of a modifying agent consisting of a mixture of linseed oil fatty acids and a mono-tertiary alkyl substituted benzoic acid containing from 4 to 10 carbon atoms in the tert-alkyl side chain, the said substituted benzoic acid making up from 21% to 38% by weight of the modifying agent.

12. A coating composition comprising dispersed in a volatile solvent for oil-modified alkyd resins, a pigment, and a short oil-modified alkyd resin comprising the resinous reaction product of a mixture of a dicarboxylic acid containing from 2 to 10 carbon atoms, an equimolecular to 30 mol percent excess of an aliphatic polyhydric alcohol containing at least three esterifiable hydroxyl groups, and 25% to 50% by weight of the said alkyd of a modifying agent consisting of a drying oil fatty acid and a mono-tertiary alkyl substituted aromatic monocarboxylic acid wherein the carboxyl group is attached directly to the aromatic nucleus and the tert-alkyl side chain contains from 4 to 16 carbon atoms the said aromatic monocarboxylic acid making up from 21% to 38% by weight of the modifying agent.

13. A coating composition containing as the major film-forming substituent, a resinous reaction product of a mixture comprising an acid component of the group consisting of polycarboxylic acids, polycarboxylic acid anhydrides, and polycarboxylic acid halides, an alcohol containing at least three esterifiable hydroxyl groups, and 25% to 50% by weight of the said alkyd of a modifying agent consisting of at least one drying component of the group consisting of drying oils, drying oil fatty acids, mono- and diglycerides of the drying oil fatty acids and monohydric alcohol esters of the drying oil fatty acids, and at least one aromatic monocarboxylic acid wherein one of the ring carbon atoms is joined to a carboxyl group and a single other ring carbon atom is joined to a tertiary alkyl radical wherein the said tertiary alkyl radicals contain from 4 to 16 carbon atoms, the said aromatic acid making up from 21% to 38% by weight of the modifying agent.

ROY W. H. TESS.
THOMAS F. MIKA.

REFERENCES CITED

The following references are of record in the file of this patent:

UNITED STATES PATENTS

| Number | Name | Date |
|---|---|---|
| 2,352,810 | Swain | July 4, 1944 |
| 2,357,526 | Light et al. | Sept. 5, 1944 |